Nov. 24, 1959 — R. E. MORTON — 2,914,011
ORBITAL TRIMMING AND WELDING MACHINE
Filed Oct. 1, 1954 — 8 Sheets-Sheet 1

INVENTOR.
Robert Earl Morton
BY Barthel & Bugbee
Attys

INVENTOR.
Robert Earl Morton
BY Barthel & Bugbee
Attys

Nov. 24, 1959

R. E. MORTON 2,914,011

ORBITAL TRIMMING AND WELDING MACHINE

Filed Oct. 1, 1954

INVENTOR.
Robert Earl Morton
BY Barthel & Bugbee
Attys

INVENTOR.
Robert Earl Morton
BY Barthel & Bugbee
Attys

Nov. 24, 1959   R. E. MORTON   2,914,011
ORBITAL TRIMMING AND WELDING MACHINE
Filed Oct. 1, 1954   8 Sheets-Sheet 5

INVENTOR.
*Robert Earl Morton*
BY *Barthel & Bugbee*
*Attys*

Nov. 24, 1959  R. E. MORTON  2,914,011
ORBITAL TRIMMING AND WELDING MACHINE
Filed Oct. 1, 1954  8 Sheets-Sheet 6

INVENTOR.
Robert Earl Morton
BY Barthel + Bugbee
Attys

INVENTOR.
Robert Earl Morton
BY Barthel + Bugbee
Attys

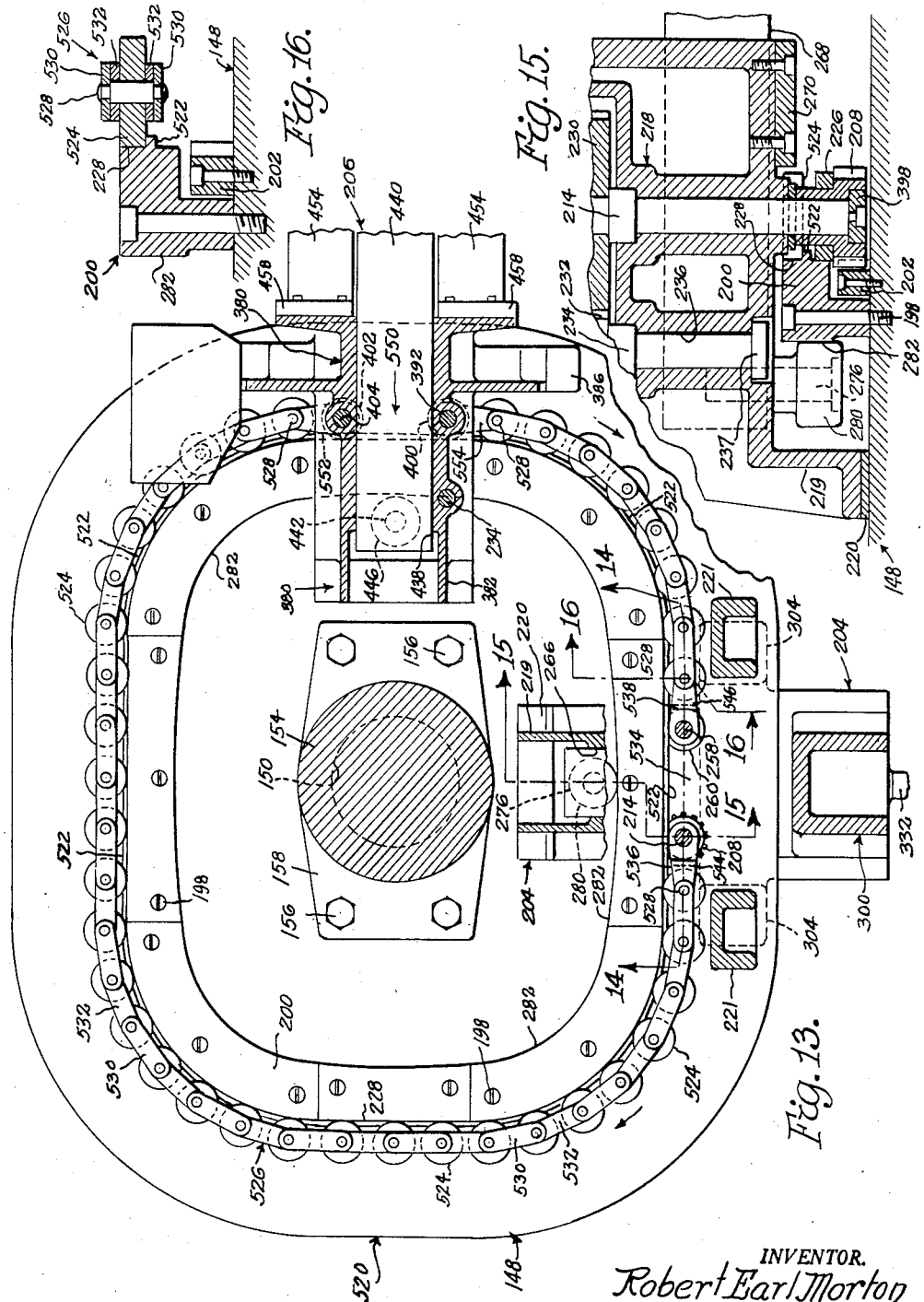

United States Patent Office 2,914,011
Patented Nov. 24, 1959

2,914,011

ORBITAL TRIMMING AND WELDING MACHINE

Robert Earl Morton, Whitehall, Mich.

Application October 1, 1954, Serial No. 459,580

4 Claims. (Cl. 113—59)

This invention relates to welding machines and, in particular, to guided traveling welding machines wherein the welding implement is guided while it travels along a predetermined path, which, for the purposes of the present invention, will be termed an orbital welding machine wherein the welding implement is guided as it travels along an orbital path. The term orbital is used in the sense in which it is defined in the Century Dictionary and Cyclopedia, published in New York by the Century Company, namely:

"Orbit, n. from Latin 'orbita' the track of a wheel, a rut, hence any track, course, or path, an impression or mark, a circuit or orbit, as of the moon.

"Orbital, a. 1. Pertaining to or in an orbit: as, 'orbital motion.'"

One object of this invention is to provide an orbital welding machine wherein the two workpieces are to be united along an orbital junction of predetermined outline, and wherein the workpieces are clamped between opposed clamping members which hold them tightly in abutment with one another while the welding implement, such as an arc welding device, welding torch or other uniting appliance, is guided along the said predetermined orbital path as welding proceeds.

Another object is to provide an orbital trimming and welding machine of the foregoing character provided with a trimming device which precedes the welding implement and removes sufficient stock from the edges of the parts to be welded to eliminate irregularities, to produce a better welded joint, and to improve the appearance of the welded parts at their junction.

Another object is to provide an orbital trimming and welding machine of the foregoing character wherein the welding implement carriage and the trimming device, if provided, are positively and precisely driven while they are being guided accurately around the said predetermined orbital path.

Another object is to provide an orbital welding machine of the foregoing character wherein the workpieces to be welded together are protected from the heat developed by the welding device by orbitally shaped clamping elements which conform to the orbital shape of the junctions of the parts to be welded, and which also carry away the heat developed during welding, these clamping elements being interposed between projecting flanges to be welded and the workpiece parts to which the flanges are attached.

Another object is to provide an orbital welding machine of the foregoing character which is especially adapted to the welding of parts of workpieces of delicate construction requiring faultless welded junctions which will be air-tight and leak-free, such as, for example, the welding of the opposing halves of a television tube.

Another object is to provide an orbital welding machine of the foregoing character which is sufficiently precise in its operations to enable severance of the parts and rewelding thereof if, upon testing, the workpiece initially welded is found to be unsatisfactory in any respect for commercial use, thereby enabling the workpiece halves to be severed, repaired or readjusted, and reunited along a new junction, thereby salvaging the parts which might otherwise be lost under prior processes and with prior welding apparatus.

Another object is to provide an orbital welding machine of the foregoing character wherein one portion of the machine is movable out of alignment with the other portion thereof for loading and unloading of the workpiece halves and welded workpiece respectively, thereby facilitating production and reducing labor costs.

Another object is to provide an orbital welding machine, as set forth in the object immediately preceding, wherein a plurality of workpiece part carriers is provided and movable into and out of alignment with the other portion of the machine at different times for clamping and welding purposes, the movable part carriers of the machine carrying the workpiece parts and movable alternately or successively into the welding position, thereby increasing the rate of production and enabling one carrier to be loaded or unloaded while the other carrier is in the welding position.

Other objects and advantages of the invention will become apparent during the course of the following description of the accompanying drawings, wherein:

Figure 13 is a horizontal section similar to Figure 5, but of a slightly modified machine;

Figure 14 is a fragmentary vertical longitudinal section taken along the line 14—14 in Figure 13;

Figure 15 is a fragmentary vertical cross-section taken along the line 15—15 in Figure 13; and Figure 16 is a fragmentary vertical cross-section taken along the line 16—16 in Figure 13.

Hitherto, the welding of delicate parts to be united along an orbital path of a predetermined outline while the parts are aligned with one another has presented serious problems which the present invention has solved. These problems are particularly serious where the parts to be united are of composite construction such as, for example, television tubes composed of glass members with metal elements of orbital outline bonded or otherwise secured thereto and wherein the parts are to be welded to one another along these orbital metal elements, with a leakproof joint formed thereby. The bonding of such orbital elements to the glass members is carried out by fusion of the glass to the metal at high temperatures which cause warping or waviness of the metal to develop, increasing the difficulty of providing a leakproof welded joint. The additional securing, as by welding, of thin metal flanges to the orbital metal elements, wherein the flanges, rather than the elements, are united to one another, has somewhat reduced these difficulties, but the major problems still have remained. This is particularly true where it is found, upon subsequent testing, that the electrical elements housed within the united workpiece parts are not sufficiently satisfactory, either in construction, arrangement or operation for commercial salability, and wherein it is desirable to enable the parts to be separated, repaired or rearranged, and subsequently reunited, thereby enabling the salvaging of parts which previously have had to be discarded and were suitable only for scrap.

Figure 12:
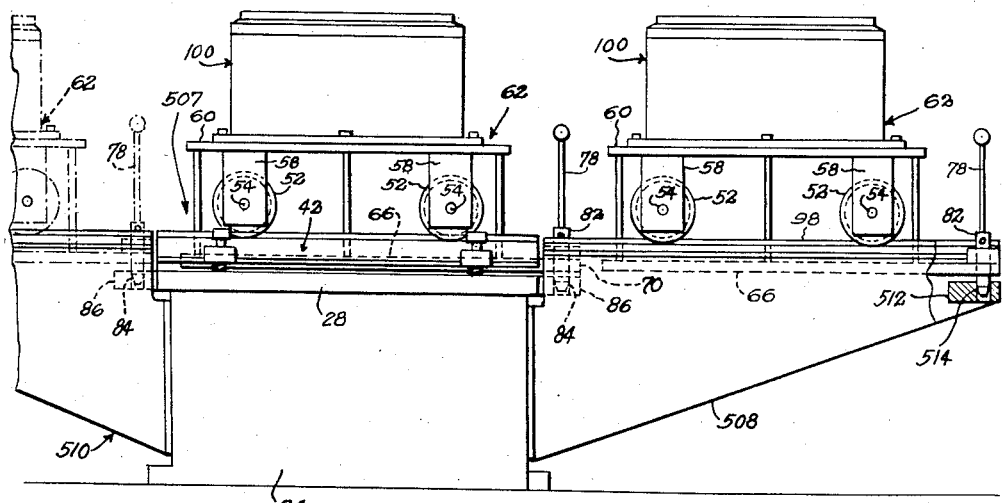
Figure 12 is a front elevation of a modification of the lower portion of Figure 1, wherein two traveling reciprocable workpiece carriers are provided for alternate loading and welding for each carrier.

The present invention provides an orbital trimming and welding machine wherein the thin sheet-metal flanges which have been previously secured as by welding to the orbital elements bonded to the glass components, are tightly clamped between opposing clamping members, trimmed to even up their edges before welding, and then welded together. The clamping members also carry away the heat while welding is proceeding, the welding implement carriage being meanwhile positively and precisely driven while guided along the predetermined orbital path. The present invention enables the welded flanges to be subsequently severed from one another, if desired, enabling the workpiece halves to be separated in the event the welded workpiece is found unsatisfactory for any reason. This permits the contents thereof to be repaired or rearranged and the flanges subsequently reunited along a new junction, thereby enabling salvaging the parts which might otherwise have been lost under prior processes employing prior welding apparatus. The present invention also facilitates the mass production of such welded units by providing a workpiece carrier which is movable into and out of alignment with the remainder of the machine into and out of the welding position respectively so as to facilitate loading and unloading. A modification of the invention shown in Figure 12 provides a plurality of such workpiece carriers, one of which is adapted to be loaded or unloaded while the other is in the welding position, thereby enabling the different operations to be carried on simultaneously and further speeding up production.

Figures 1, 8, 9, 10:
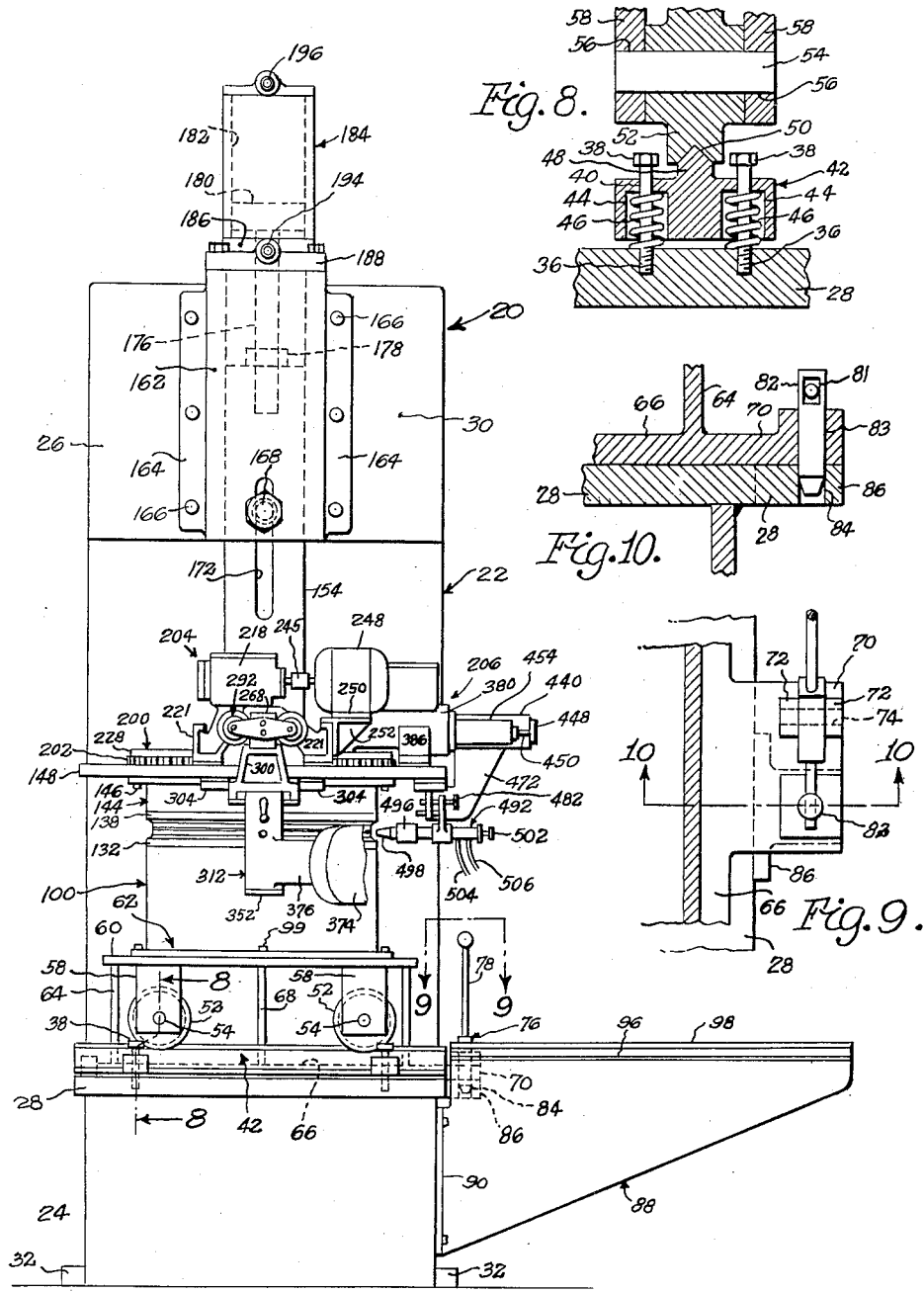
Figure 1 is a front elevation of an orbital trimming and welding machine, according to one form of the invention, with the workpiece carrier in the welding position.
Figure 8 is an enlarged fragmentary cross-section taken along the line 8—8 in Figure 1, showing details of the resiliently-mounted track upon which the workpiece carrier is yieldingly and reciprocably supported.
Figure 9 is a top plan view, partly in horizontal section, of the indexing device for positively and temporarily locking the workpiece carrier in its welding position.
Figure 10 is a vertical section taken along the line 10—10 in Figure 9.
Figure 2:
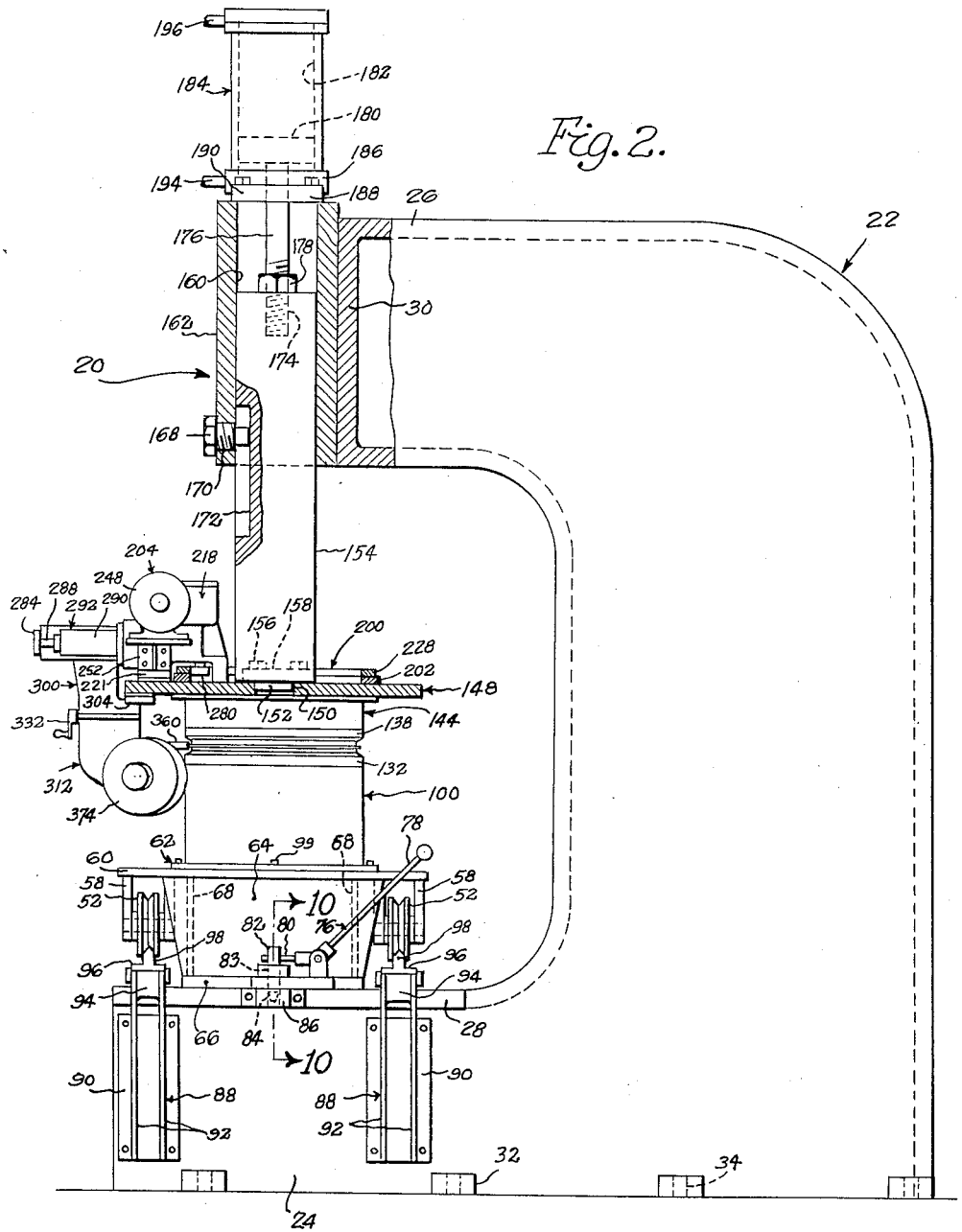
Figure 2 is a right-hand side elevation, partly in vertical section, of the welding machine shown in Figure 1.

Referring to the drawings in detail, Figures 1 and 2 show an orbital welding and trimming machine, generally designated 20, according to one form of the invention, as supported by a hollow C-shaped frame, generally designated 22, preferably fabricated from welded plates and having a bottom arm portion 24 and a top arm portion 26. The bottom arm portion 24 has a horizontal mounting plate 28 on the top thereof, whereas the top arm portion 26 has a vertical mounting plate 30 on the front thereof. Feet 32 are secured to the lower end of the frame 22 for receiving holddown bolts (not shown) in the holes 34 in order to secure the frame 22 to the floor or to a foundation. The mounting plate 28 is drilled and threaded with four sets of spaced bolt holes 36 arranged in pairs (Figures 1 and 8) for receiving bolts or screws 38. The latter pass through holes 40 in the upper surfaces of two parallel tracks or rails 42 into downwardly extending recesses 44 housing helical compression springs 46 surrounding the bolts 32. The upper ends of the springs 46 engage the top wall of the rail 42 so as to normally hold the rail 42 off the mounting plate 28.

Each of the rails 42 is provided with an upstanding rib 48 of V-shaped cross-section (Figure 8) for receiving the correspondingly-shaped V-groove 50 in wheels 52 arranged in tandem with one pair of wheels 52 engaging each track or rail 42. The wheels 52 are mounted on axles 54, the ends of which are received in aligned bores 56 in spaced parallel arms 58 secured to and extending downwardly from a supporting plate 60 of a workpiece carrier 62. Secured to and also extending downwardly from the opposite ends of the supporting plate 60 are end plates 64 with tapered side edges (Figure 2) secured at their lower ends to a base plate 66 which is braced relatively to the supporting plate 60 by intermediate members 68. The base plate 66 extends between and below the rails 42 in close proximity to the mounting plate 28.

One end of the base plate 66 is provided with an extension portion 70 (Figure 9) which carries an upstanding pair of spaced arms 72 drilled to receive a pivot pin 74 which pivotally supports a bellcrank or angle lever 76, one arm 78 of which serves as a handle and the other arm 80 arranged at obtuse angles thereto enters a suitable slot 81 in a locking pin or bolt 82 (Figure 10) which reciprocates vertically in a hole 83 into and out of a locking hole 84 in a keeper 86 bolted to the side edge of the mounting plate 28. As a consequence, when the workpiece carrier 62 is moved into a position where the locking bolt 82 is directly over the hole 84, the operator can swing the arm 78 counterclockwise (Figure 2) to move the bolt 82 downward into the hole 84.

Secured to one side of the bottom arm portion 24 of the frame 22 is a pair of spaced parallel brackets 88 consisting of mounting plates 90 and approximately triangular parallel plate arms 92 secured thereto (Figures 1 and 2). The brackets 88 are spaced apart the same distance as the rails 42 and have horizontal upper connecting bars 94 upon which are mounted parallel extension rails 96 of inverted T-shaped cross-section similar to the rails 42 and similarly provided with inverted V-shaped upper ribs 98 adapted to fit the grooved wheels 52 of the carrier 62. The rails 96 are aligned with the rails 42 when the downward pressure on the carrier 62 is released and the springs 46 (Figure 8) are permitted to push the rails 42 upward. In Figure 1, the rails 42 are shown depressed below the level of the rails 96 because of the downward pressure exerted upon them by the upper portion of the press described below. By reason of these extension rails 96, the carrier 62 may be run out to the right-hand side of Figure 1 for loading or unloading purposes, as described below in connection with the operation of the invention.

Mounted on and bolted or otherwise secured as at 99 the supporting plate 60 of the carriage 62 is a flanged hollow workpiece support 100 (Figures 1, 2, 4 and 6) having the outline of the orbital path along which it is desired to clamp the edges of the workpiece to be welded. In the example shown in the drawings, the workpiece support or lower clamping member 100 is of an orbital outline or cross-section corresponding to the outline of the edge portion of a television tube, generally designated 102, having upper and lower halves 104 and 106 respectively (Figure 6) known in the television industry as the face plate and funnel respectively. Bonded as by fusion to the lower edge 108 of the face plate 104 and to the upper edge 110 of the funnel 106 are so-called rings 112 and 114 respectively. These rings 112 and 114 are of a metal, such as stainless steel, which can be suitably bonded to the glass of which the face plate 104 and funnel 106 are made, without setting up excessive strains therein due to differing coefficients of expansion. The rings 112 and 114 are bonded to their respective members 104 and 106 by heating the members 104 and 106 to a fusion temperature in order to soften the glass and cause it to adhere firmly to the rings 112 and 114.

At the high temperatures required, however, the rings 112 and 114 frequently become uneven or warped to such an extent that they will not fit one another in order to provide a leakage-free or air-tight junction. For this reason, the manufacturer of the television tube 102 additionally secures, as by welding, a thin sheet metal flange 116 or 118 respectively to the rings 112 or 114 (Figure 6), sheet copper being found suitable for this purpose. The flanges 116 and 118 externally of the television tube 102 are provided with oppositely-bent circumferential portions 120 and 122 respectively, terminating in parallel contacting circumferential portions or outer flange rims 124 and 126, respectively. These outer flange rims 124 and 126 are the portions which are to be welded to secure the face plate 104 and funnel 106 together with an airtight junction capable of holding a high vacuum.

Figures 6, 11:
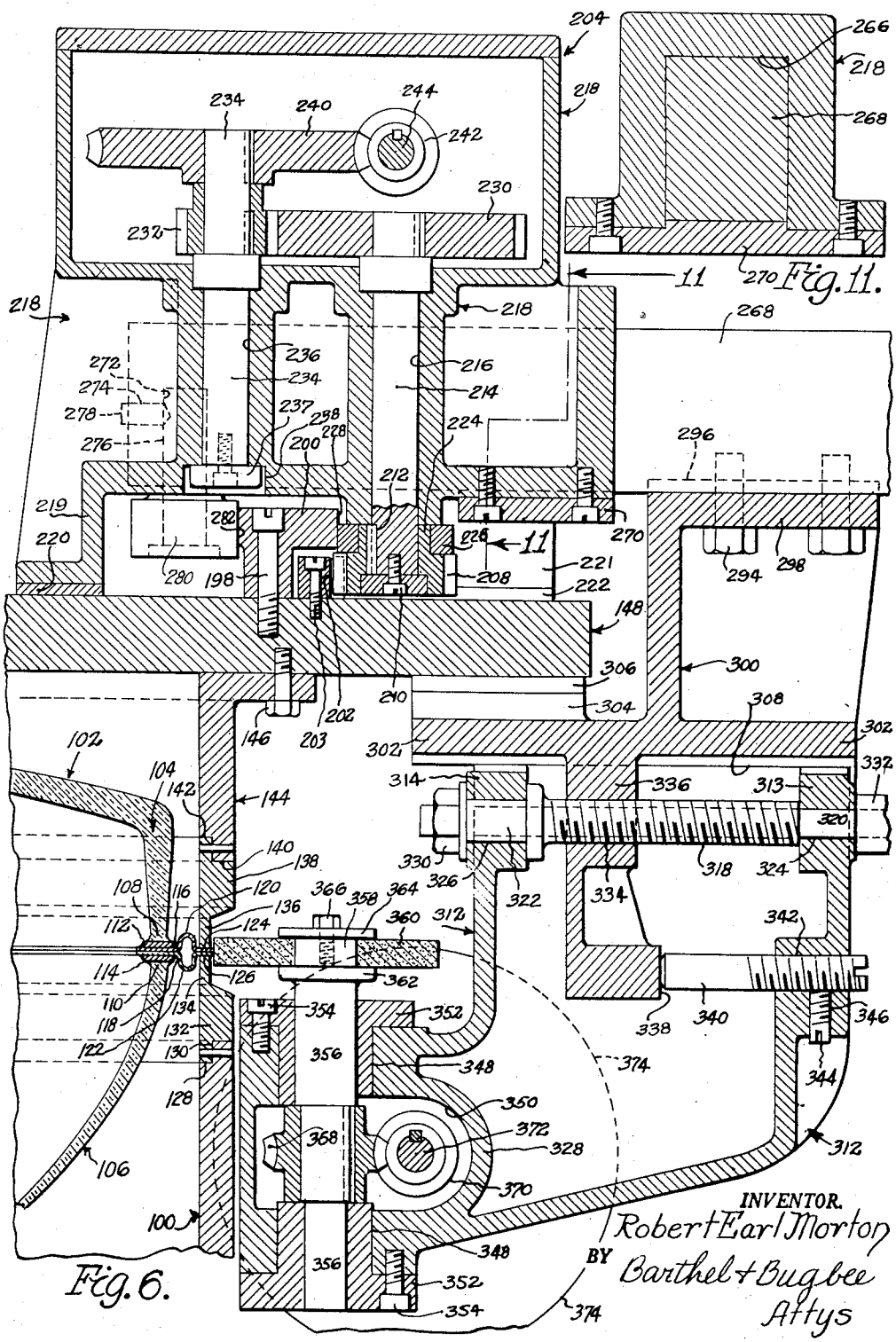
Figure 6 is an enlarged fragmentary vertical cross-section taken along the line 6—6 in Figure 3.
Figure 11 is a vertical cross-section taken along the line 11—11 in Figure 6, showing the manner in which the reciprocating sustaining bar for the trimming device is supported.

For the purpose of engaging and supporting the lower flanged rim 126 and at the same time carrying away the heat applied thereto during welding, the workpiece support 100 is provided with a rabbeted upper edge 128 (Figure 6) to which is pinned or otherwise secured the lower rabbeted edge 130 of a lower chill and clamping ring 132, the upper edge portion of which is narrowed as at 134 to conform to the lower flange rim 126 resting thereon. The upper flange rim 124 is engaged by the similar narrow portion 136 of an upper chill ring or clamping member 138 which, like the lower member 132 is of orbital shape corresponding to the outline of the rim portions 124 and 126. The member 138 is similarly rabbeted as at 140 to engage and fit the rabbeted portion 142 of the flanged upper clamping member 144 to which it is also pinned or otherwise secured (Figure 6). The flanged upper clamping member 144 is likewise of the above-mentioned orbital shape and is bolted or otherwise secured as at 146 to a platen 148 or platform 148 (Figure 6) of orbital outline. It is this platen or platform 148 which supports the trimming and welding devices and the driving mechanism for them, as described below.

The platen 148 is provided with a central opening 150 (Figure 2) which receives the reduced diameter portion 152 on the lower end of a plunger 154 and is secured thereto by bolts 156 threaded therein through an attachment plate 158 (Figure 5) secured to the lower end of the plunger 154. The plunger 154 is of cylindrical shape and reciprocates in a bore 160 (Figure 2) formed in a plunger guide 162 having vertical edge flanges 164 (Figure 1) bolted or otherwise secured as at 166 to the mounting plate 30 on the front of the upper arm portion 26 of the frame 22. A stud 168 (Figure 2) is threaded through a bore 170 in the plunger guide 162 into a longitudinal groove 172 for the purpose of permitting reciprocation of the plunger 154 while preventing rotation thereof.

The upper end of the plunger 154 is bored and threaded as at 174 (Figure 2) to receive the correspondingly threaded lower end of a piston rod 176 secured tightly thereto by a lock nut 178 and terminating at its upper end in a hydraulic cylinder 184. The lower head 186 of the hydraulic cylinder 184 is provided with shoulders 188 which are bolted or otherwise secured at 190 to the upper end of the plunger guide 162. The lower head 186 and upper head 192 of the hydraulic cylinder 184 are provided with pipe connections 194 and 196 respectively for connection to a conventional press-operating hydraulic circuit (not shown) for reciprocating the piston head 180 within the cylinder bore 182. Such hydraulic circuits are well-known to those skilled in the hydraulics art and their details are beyond the scope of the present invention.

Secured as by the screws 198 to the platen 148 is an orbital guide track 200 (Figure 5), the outline of which corresponds to the outline of the rim portions 124 and 126 of the flanges 116 and 118 of the workpiece 102 to be welded. The orbital guide track 200 is of inverted L-shaped cross-section (Figure 6) beneath the outer edge of which is mounted an orbital externally-toothed driving rack 202, the outline of which also corresponds to the outline of the rim portions 124 and 126 of the workpiece 102. The orbital driving rack 202 is bolted or otherwise suitably secured as at 203 to the platen 148. Movably mounted upon the platen 148, guided by the track 200 and driven from the rack 202 are two carriages, namely a trimmer carriage 204 and a welder carriage 206 which move around the platen 148 in an orbital path.

Figure 7:
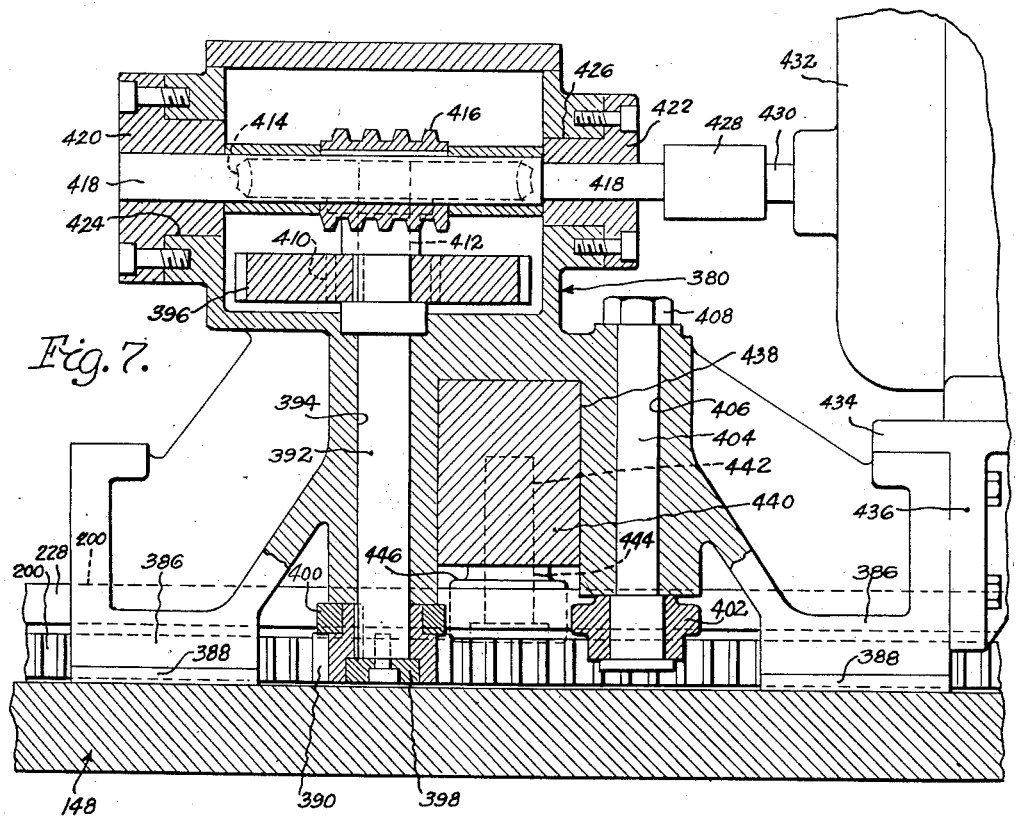
Figure 7 is an enlarged fragmentary vertical cross-section taken along the line 7—7 in Figure 5, showing details of the carriage driving mechanism for the welding implement and trimmer.

Meshing with the teeth of the orbital driving rack 202 is a pinion 208 (Figure 6) secured as at 210 and keyed as at 212 to the lower end of a shaft 214. The latter drives the trimmer carriage 204 and is journaled in a bore 216 in a housing 218 having a rear foot 219 carrying a bearing pad 220 and two spaced front feet 221 carrying bearing pads 222 (Figures 3, 5 and 6), all of which pads rest upon and slidably engage the upper surface of the platen 148 (Figures 6 and 7). The pinion 208 is also provided with a reduced diameter hub portion 224 upon which a guide roller 226 is loosely and rotatably mounted, the guide roller engaging the outer edge surface 228 of the orbital guide track 200. Keyed to the upper end of the shaft 214 is a gear 230 (Figure 6) which meshes with a pinion 232 keyed or otherwise drivingly secured to a vertical shaft 234 journaled in a vertical bore 236 in the housing 218.

Bolted or otherwise secured to the lower end of the shaft 234 is a retaining collar or disc 237 engaging a housing recess 238 of similar configuration. Keyed or otherwise drivingly secured to the upper end of the shaft 234 is a worm wheel 240 which meshes with a worm 242 keyed or otherwise drivingly secured to a worm shaft 244 coupled at 245 (Figure 3) to the shaft 246 of an electric driving motor 248. The motor 248 has a base 250 bolted or otherwise secured to a bracket 252 (Figures 3, 4 and 7) which in turn is bolted or otherwise secured to the vertical portion 254 of the housing 218. The shaft 244 is journalled in aligned flanged bearing bushings 256 mounted in the housing 218.

Figure 5:
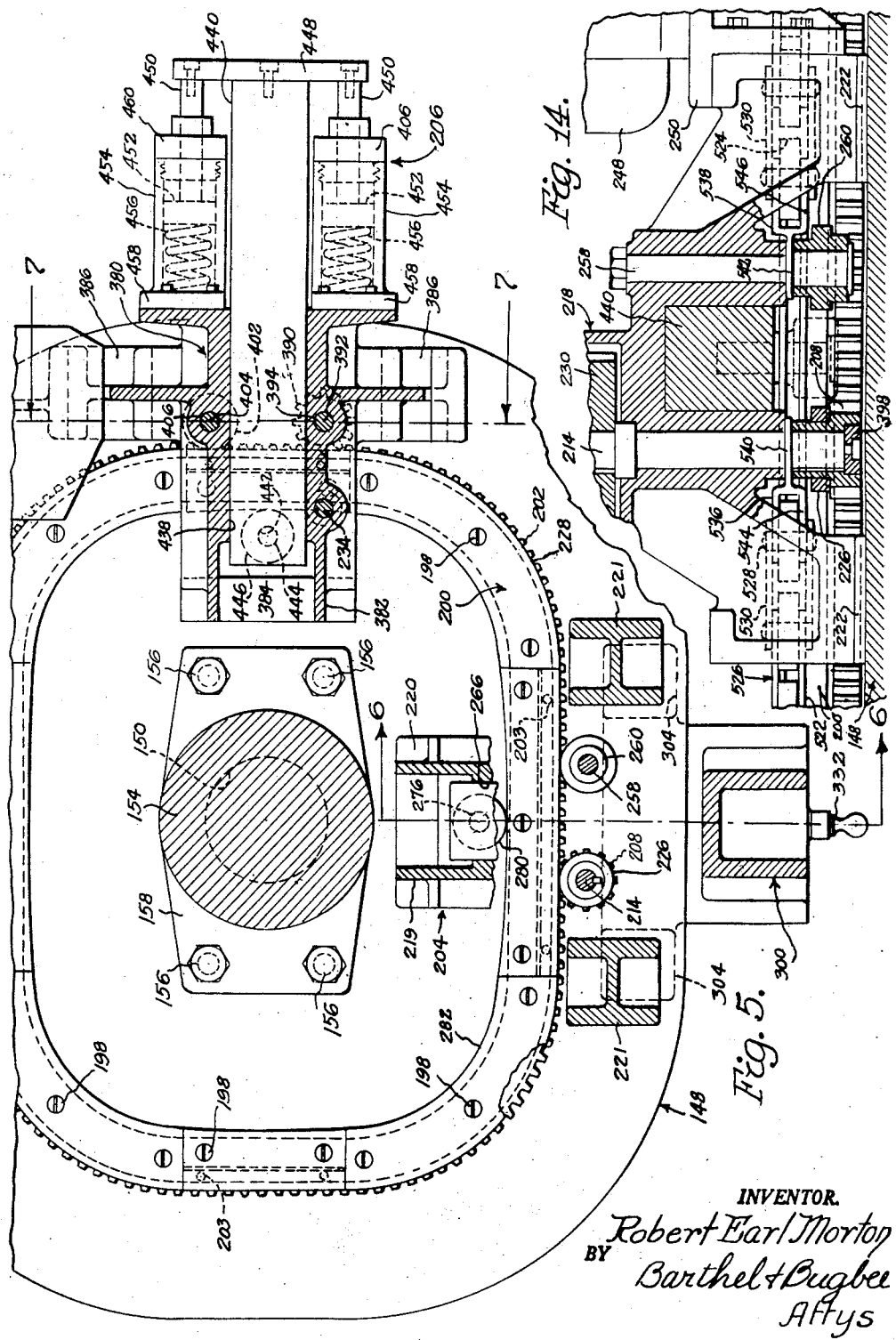
Figure 5 is a horizontal section taken along the line 5—5 in Figure 3, on the two different levels therein indicated.

The housing 218 is bored vertically parallel to the axis of the shaft bore 214 to receive a vertical axle 258 which on its lower end carries an outer roller 260 (Figure 5). The outer roller 262 is located opposite the outer contact edge 228 of the orbital guide track 200. The housing 218 is provided with an inverted horizontal slot 266, the axis of which is disposed substantially perpendicular to the plane passing through the axes of the shafts 214 and 258 (Figures 5, 7 and 11).

Reciprocably mounted in the rectangular slot 266 is a horizontally-reciprocable bar 268 retained in position by a retaining plate 270 (Figure 11) bolted across the opening on the lower or open side of the slot 266. The bar 268 near its inner end is provided with a vertical bore 272 and a transverse threaded bore 274 which receive an axle 276 and retaining set screw 278 respectively (Figure 6) for an internal guide roller or wheel 280 freely and rotatably mounted upon the axle 276 in engagement with the inner edge face 282 of the guide track 200. The reciprocable bar 268 is urged outward so as to urge the roller 280 constantly into engagement with the guide track inner edge face 282 by a cross-head 284 (Figure 3) bolted thereto as at 286 and having parallel horizontal spring plunger rods 288 anchored at their outer ends therein. The plunger rods 288 enter the parallel cylinders 290 of spring plunger devices, generally designated 292, similar to those described below in connection with the similar spring plunger devices of Figure 5. The spring plunger devices 292 urge the plunger rods 288, cross-head 284 and bar 268 in an outward direction away from the guide track 200.

Bolted or otherwise secured as at 294 (Figure 6) to the underside of the bar 268 within a recess 296 therein is the base 298 of a downwardly-extending trimmer bracket structure 300. The latter (Figures 3 and 6) has an inwardly-extending horizontal portion 302 with spaced bosses 304 on its upper surface carrying bearing pads 306 which slidably engage the underside of the platen 148. In this manner the trimmer bracket structure 300 is guided in its movement lengthwise along and around the platen 148 while it reciprocates inward and outward in response to the reciprocation of the bar 268, as explained below in connection with the operation of the invention.

Figure 3:
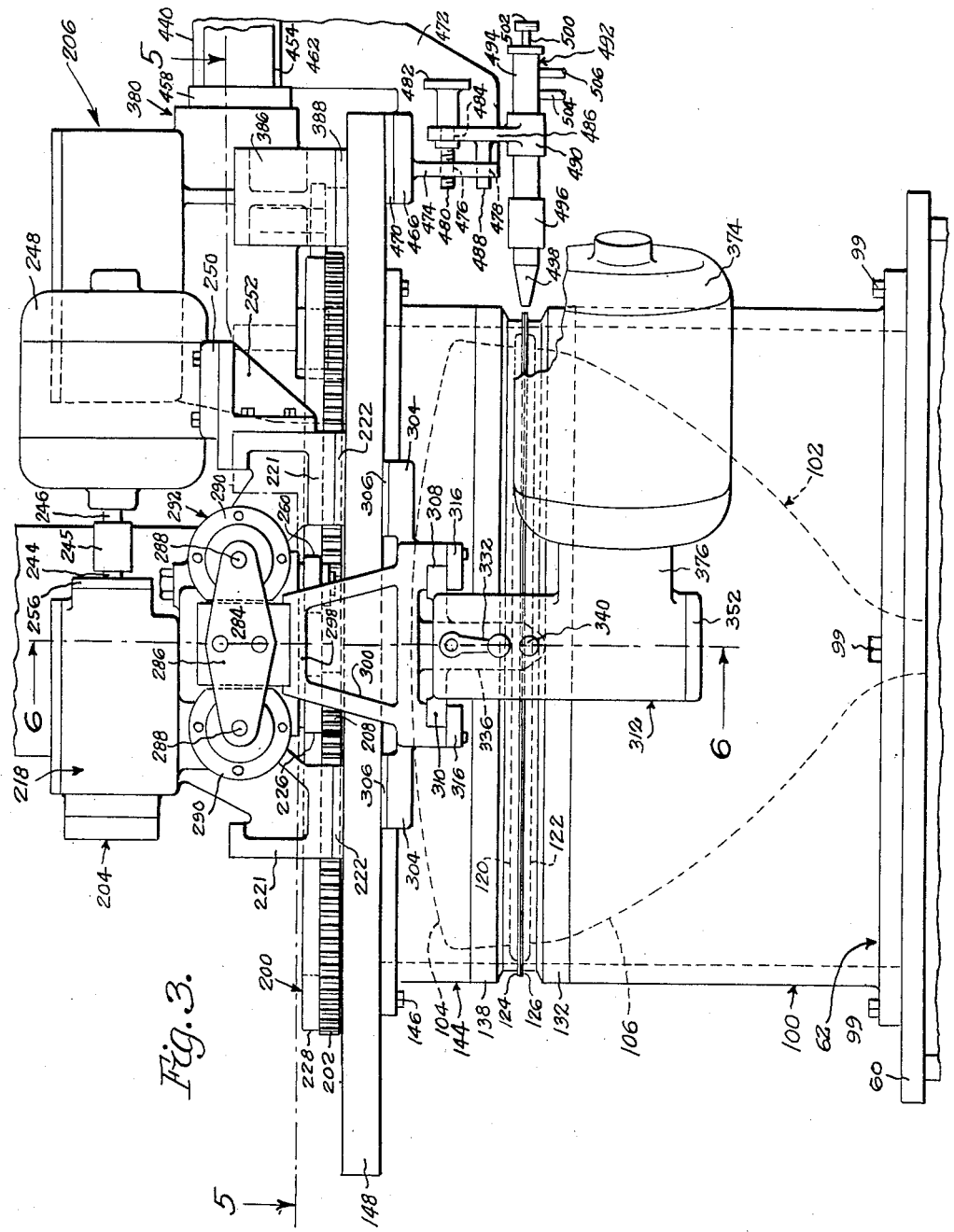
Figure 3 is an enlarged front elevation of the central portion of Figure 1, showing the clamping, guiding, trimming and welding devices in more detail.
Figure 4:
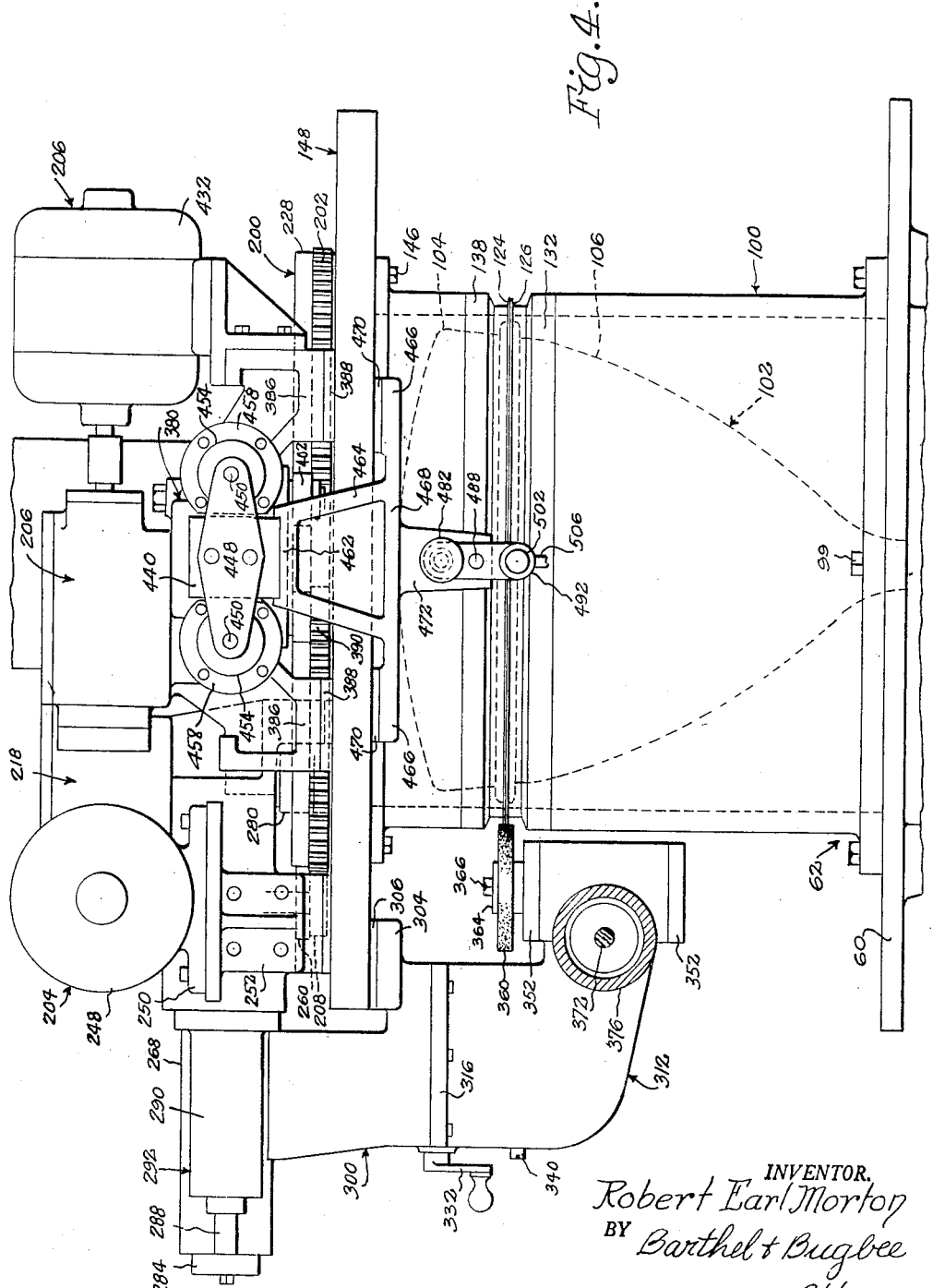
Figure 4 is a right-hand side elevation of the portion of the machine shown in Figure 3, with the trimming driving motor omitted to disclose the parts behind it more clearly.

The trimmer bracket structure 300 on the underside of its horizontal portion 302 is provided with a grooved guideway 308 (Figures 3 and 6) within which the slide portion 310 at the top of a hollow slidable elbow housing 312 reciprocates toward and away from the clamping rings 100 and 144. The slide portion 310 includes outer and inner slide parts 313 and 314 respectively (Figure 6), both of which reciprocate in the guideway 308 and are held therein by retaining bars 316 (Figure 3) bolted to the underside of the horizontal bracket portion 302 beneath the guideway 308 (Figure 3). The slidable elbow housing 312 is reciprocated for adjustment purposes by a screw shaft 318 having reduced diameter portions 320 and 322 journaled in the horizontal bores 324 and 326 in the elbow housing 312 (Figure 6) which extends downwardly and inwardly from the slide parts 313 and 314 and terminates at its lower end in a gearbox portion 328. The screw shaft 318 at its inner end is threaded to receive a retaining nut 330 and its outer end carries a hand crank 332 by which it may be rotated manually for adjustment purposes. The screw shaft 318 between the slide portions 312 and 314 passes through and threadedly engages a horizontal threaded bore 334 in an arm 336 integral with and extending downwardly from the horizontal portion 302 of the trimmer bracket structure 300. The arm 336 at its lower end terminates in a stop abutment 338 which is engaged by the inner end of a stop screw 340. The latter is threaded through a horizontal threaded bore 342 in the housing 312 and is held in its adjusted position by a set screw 344 threaded into a transverse threaded hole 346.

The gear box portion 328 contains an interrupted vertical bore 348 with a gear chamber 350 forming the interruption (Figure 6). The upper and lower portions of the bore 348 are closed by flanged bearing bushings 352 secured as at 354 to the gear box portion 328. Journaled in the bearing bushings 352 is a stepped vertical shaft 356, the upper portion 358 of which carries a rotary machining tool 360 such as a grinding wheel, milling cutter or the like, held against a shaft flange 362 by a washer 364 held down by a cap screw 366 threaded into the end of the shaft portion 358. The rotary tool 360 engages the outer edges of the upper and lower rims 124 and 126 of the upper and lower flanges 116 and 118 of the workpiece halves 104 and 106 respectively to remove irregularities therefrom and prepares them for accurate welding.

Keyed or otherwise secured to the stepped shaft 356 between the bearing bushings 352 (Figure 6) is a worm wheel 368 disposed in the chamber 350. Meshing with the worm wheel 368 is a worm 370 which is keyed or otherwise drivingly secured to the armature shaft 372 of a trimmer driving motor 374 mounted on the end of a horizontal cylindrical trimmer housing extension 376.

The welder carriage 206, which is also mounted on the upper surface of the platen 148, has a welder supporting housing, generally designated 380, which is generally similar in construction to the trimmer housing 218 but differs sufficiently to require a separate description. The welder carriage housing 380 also has three-point support upon and slidable engagement with the upper surface of the platen 148 by being provided with a single central downwardly-extending rear foot 382 with a bearing pad 384 (Figure 5) slidably engaging the platen 148 on the rearward side of the guide track 200, and a pair of laterally diverging front feet 386 each carrying a bearing pad 388 slidably engaging the platen 148 on the forward side of the guide track 200. These front and rear feet 386 and 382 respectively slant upward toward the upper portions of the housing 380 (Figure 7). The welder carriage 206 is driven from the orbital rack 202 in a manner similar to the trimmer carriage 204, namely by a pinion 390 which is keyed or otherwise drivingly secured to the lower end of a vertical shaft 392 journaled in a vertical bore 394 in the housing 380 and having a gear 396 keyed or otherwise drivingly secured to its upper end.

The pinion 390 is retained on the lower end of the shaft 392 by a retaining disk 398 bolted thereto, and on its reduced diameter hub carries a loosely and rotatably mounted guide roller 400 which engages the outer or forward edge 228 of the guide track 200 while the pinion 390 meshes with and drivingly engages the stationary orbital driving rack 202. A second forward guide roller 402 is loosely and rotatably mounted on the lower end of a vertical axle 404 which is seated in a vertical bore 406 in the housing 380 (Figure 7) and retained in position by a retaining nut 408. The driving shaft 392 of the driving pinion 390 of the welder carriage 206 is driven in a similar manner to the drive shown in the upper part of Figure 6 for the trimmer carriage 204, namely by a pinion 410 (Figure 7) meshing with the gear 396 and keyed or otherwise drivingly secured to a vertical shaft 412 to the upper end of which a worm wheel 414 is keyed or otherwise drivingly secured.

Meshing with the worm wheel 414 is a worm 416 which is keyed or otherwise drivingly secured to a horizontal shaft 418 journaled in a pair of flanged bearing bushings 420 and 422 bolted or otherwise secured in oppositely-disposed aligned bores 424 and 426 in the upper part of the housing 380. The shaft 418 is coupled as at 428 to the armature shaft 430 of a welder carriage driving motor 432 having a base 434 which is bolted to an angle bracket 436, the latter in turn being bolted to one of the front feet 386 of the housing 380 (Figure 7).

The housing 380, like the similar housing 218 of the trimmer carriage 204, is provided with a transverse groove 438 (Figures 5 and 7) disposed substantially perpendicularly to the direction of travel of the welder carriage 206 along the platen 148. Reciprocably mounted in this transverse groove 438 is a bar 440 of rectangular cross-section which, like the corresponding bar 268, is bored transversely as at 442 near its rearward end to receive a vertical axle 444 upon the lower end of which a rearward guide roller 446 is loosely and rotatably mounted. This guide roller 446 engages the rearward edge 282 of the orbital guide track 200 on the opposite side thereof from the guide rollers 400 and 402.

Bolted or otherwise secured to the outer end of the reciprocable bar 440 is a cross head 448 (Figures 4 and 5) similar in construction to the cross head 284 of the trimmer carriage 204 and similarly spring-pressed outward in the following manner. Bolted or otherwise secured to the opposite outer ends of the cross head 448 are parallel plunger rods 450 (Figure 5) having on their inner ends piston heads 452 reciprocable in spring cylinders 454 containing compression springs 456. The forward ends of the compression springs 456 engage the piston heads 452 and their rearward ends engage the mounting plates 458 by which the cylinders 454 are bolted or otherwise secured to the housing 380. The piston rods 450 pass through suitably bored cylinder heads 460 threaded into the outer ends of the spring cylinders 454. As previously stated above in connection with the description of the cross head 284 and plunger rods 288 of the trimmer carriage 204, the cylinders 290 of the spring plunger devices 292 are of similar internal construction to the construction just described.

Bolted or other wise secured to the under side of the outer end of the reciprocating bar 440 below the cross head 448 is the attachment portion 462 of a downwardly-extending twin-armed bracket 464 having oppositely-extending bosses 466 on the horizontal portion 468 thereof, the bosses 466 on their upper surfaces carrying bearing pads 470 slidably engaging the underside of the platen 148. Integral with the horizontal portion and extending downwardly therefrom is a bracket extension 472 terminating in a vertical boss or arm 474 (Figure 3) provided with two parallel holes 476 and 478, one above the other, the former being threaded and the latter being smooth-walled. Threadedly engaging the threaded hole 476 is a screw shaft 480 carrying on its outer end a hand wheel 482 and rotatably mounted in a hole 484 in a welder bracket 486 having a guide rod 488 extending horizontally therefrom into slidable engagement with the smooth-walled hole 478. The bracket 486 at its lower end is provided with a bored hub 490 in which is mounted a welding device, generally designated 492, of any conventional type such as an electric arc welder or, as shown in the present drawings for purposes of illustration, a gas-operated welding torch.

The welding device 492, when a torch as shown in Figure 3, consists of a barrel 494 having at one end a coupling 496 for a nozzle 498 from which the welding flame emanates, and at its other end a valve rod 500 carrying a hand wheel 502 by which the supply of gas to the nozzle 498 is controlled by means of a valve (not shown) within the barrel 494. Gases, such as oxygen and hydrogen or acetylene is supplied to the barrel 494 by means of gas supply pipes 504 and 506 respectively. The nozzle 498 is aimed at the junction of the rim portions 124 and 126 of the flanges 116 and 118 shown in Figure 6, where welding is to be carried out.

The modified trimming and welding machine, generally designated 507, shown in Figure 12, is similar to the machine 20 shown in Figures 1 to 11 inclusive, with the exception that in place of a single pair of spaced parallel brackets 88 mounted on one side only of the frame base portion 24, two pairs of such spaced parallel brackets 508 and 510 are provided, one pair being mounted on each of the opposite sides of the frame base portion 24. In this manner, the machine 507 is double-sided, so that a pair of workpiece carriers 62 may be accommodated at one time in the machine 20, one workpiece carrier being in the loading or unloading position seen at the right of Figure 12, while the other is in the central or working position of the machine. Each workpiece carrier 62 of Figure 12 is of the same construction as the workpiece carrier 62 described above in connection with Figures 1 and 2, and so also is the resiliently mounted rail construction 42 shown in Figures 1, 2 and 8. In order, however, for the workpiece carrier 62 not in use to be held in an immovable position, the pair of brackets 508 has a cross bar 512 secured at its opposite ends to the brackets 508 and extending therebetween, a hole 514 being provided therein corresponding to the locking bolt hole 84 of Figure 10 in order to receive the locking bolt 82 when the workpiece carrier 62 to the right in Figure 12 is rolled out to its position of loading, unloading or storage on the brackets 508. In order to similarly lock the workpiece carrier 62 in its extreme left-hand position on the left-hand pair of brackets 510 of Figure 12 (shown in dotted lines therein), the horizontal mounting plate 28 is provided with locking bolt keepers 86 at both ends of the mounting plate 28 (Figure 12) instead of at only one end as in Figure 1. Each keeper 86 has a locking bolt hole 84 therein for receiving the locking bolt 82 in the manner described above.

In the operation of the invention, in the form shown in Figures 1 to 11 inclusive, let it be assumed that the upper and lower halves 104 and 106 of workpieces 102 are to be trimmed and welded, such as the face plate 104 and funnel 106, and that a supply of these has been received from the manufacturer, with the rings 112, 114 and flanges 116 and 118 already bonded or welded in position by the manufacturer thereof. Let it be assumed that the components of the television tube have been placed in the interior thereof and that the tube 102 is ready for welding. Let it also be assumed that a supply of these television tube halves 104 and 106 with their respective components mounted therein have been placed in proximity to the machine 20 within convenient reach of the operator. Since the operation of the double-sided machine 507 of Figure 12 is generally similar to that of the single-sided machine 20, the description thereof requires little duplication.

To load the workpiece carrier 62, the operator first raises the platen 148 by operating the controls (not shown) of the hydraulic circuit to supply pressure fluid to the lower connection 194 of the hydraulic cylinder 184 (Figure 2), exhausting fluid from the upper fluid connection 196 by means of a conventional four-way valve (not shown). The pressure fluid thus entering beneath the piston head 180, raises the latter and its piston rod 176, consequently raising the plunger 154 and the platen 148 connected to the lower end thereof. This action raises the trimming and welding carriages 204 and 206 completely out of the way, together with the upper clamping member 144 and its chill ring or clamping member 138 attached thereto (Figure 6). The lower clamping member 100 and its lower chill ring or clamping member 132 are now exposed and free from interference with lateral motion.

The operator now grasps the handle 78 (Figure 2) and swings it downward to the right, rocking the bent lever 76 around its fulcrum 74, thereby causing the arm 80 to swing upward and move the locking bolt 82 upward out of its keeper hole 84. The operator is now able to roll the carrier 62 to the right onto the rails 98 on the spaced brackets 88 (Figure 1) since the upward motion of the platen 148 and the previously-mentioned parts carrier with it has released the springs 46 (Figure 8) to move the rails 42 upward into horizontal alignment with the rails 98 of the brackets 88. The operator then rolls the work piece carrier 62 outward onto the bracket 88 and, if the machine has just performed a trimming and welding operation, he removes the finished workpiece 102 from its position on the upper edge 126 of the chill ring or clamping member 132 (Figure 6) and transfers it to a suitable receiver. He then places a pair of superimposed upper and lower workpiece halves 104 and 106 on the same edge 126 of the chill ring 132, moves the workpiece carrier 62 to the left back into its position underneath the platen 148, and swings the handle 78 upward to the left in order to reinsert the locking bolt 82 in the hole 84 in the keeper 86 secured to the right-hand end of the bed plate 28 (Figure 1). With the realignment of the workpiece carrier 62 thus accomplished, the operator actuates the controls of the hydraulic circuit again to admit pressure fluid to the upper connection 196 of the hydraulic cylinder 184 and exhaust it from the lower connection 194 in order to lower the piston head 180, the piston rod 176, the plunger 154, the platen 148, the trimmer and welder carriages 204 and 206, the upper clamping member 144, and the upper chill ring 138, causing its lower edge of its narrow portion 136 to move downward into clamping engagement with the flange rims 124 and 126 (Figure 6). A sufficient clamping pressure is exerted to force the rims 124 and 126 tightly into engagement with one another, thereby smoothing out any unevenness, waviness, or irregularities of surface therein. The pressure necessary for doing this clamping and smoothing varies with the nature of the workpiece, a pressure of 15 tons being found suitable in practice for certain types of television tubes.

The operator then shifts the motor controls of the motors 248, 432 and 374 to cause the trimmer and welder carriages 204 and 206 to start moving around the periphery of the orbital-shaped platen 148 in a clockwise direction (Figure 5), by causing their driving pinions 208 and 390 respectively to rotate in clockwise directions. The engagement of the teeth of the pinions 208 and 390 with the teeth of the orbital driving rack 202 causes the carriages 204 and 206 to move orbitally, guided by the engagement of their respective guide rollers 226, 260, 280 and 400, 402, 446 engaging the outer and inner edge faces 228 and 282 of the guide track 200.

Meanwhile, the rotation of the grinding wheel 360 or other rotary tool resulting from the energization of the motor 374 causes it to smooth off the projecting edges of the rims 124 and 126 of the flanges 116 and 118 (Figure 6) while the trimmer carriage 204 moves, as a whole, in its orbital path around the rims 124 and 126.

Following immediately behind the trimmer wheel 360 comes the nozzle 498 of the welding torch 492 or, if substituted, the arc welding electrode of an electric arc welding device (not shown). In either case, the intense heat produced at the just-smoothed edges of the rims 124 and 126 of the flanges 116 and 118 (Figures 3 and 6) renders the metal thereof plastic and causes the rims 124 and 126 to fuse together in an air-tight joint. When the circuit has been completed, and the rims 124 and 126 have been fully joined throughout their entire circumference, the operator again actuates the hydraulic circuit controls to lift the platen 148 and its connected carriages 204 and 206, together with the upper clamping members 144 and 138 (Figure 6), enabling the work carrier 62 to be released from its locked position (Figure 1) by shifting the handle 78 of the lever 76, again rolling the work carrier 62 to the right onto the rails 98 of the brackets 88. The welded workpiece 102 is then lifted out of the cavity within the lower clamping members 100 and 132, and a new assembly lowered into position for the next welding operation. The cycle of operations is then repeated in the foregoing manner, as described above.

The operation of the modified or double-ended machine 507 of Figure 12 is similar to that of the single-ended machine 20 of Figures 1 to 11 inclusive, except that a pair of workpiece carriers 62 is available for travel into and out of position beneath the platen 148 from two pairs of rail brackets 508 and 510 on opposite sides of the machine 507. By this arrangement, the trimming and welding operation may be carried out, employing one workpiece carrier 62, while another workpiece carrier 62 is in position on the rail brackets 508 for loading or unloading purposes. When the second workpiece carrier 62 has been unloaded and reloaded, and trimming and welding have been completed on the workpiece 102 held by the first workpiece carrier 62, the latter is rolled to the left onto the rail brackets 510 and locked in position preparatory to moving the loaded workpiece carrier 62 from the right hand rail brackets 508 into the position beneath the platen 148 just vacated by the first workpiece carrier 62, which is then unloaded and reloaded in the previously-described manner. By the use of the double-ended machine 507 of Figure 12, therefore, production is accelerated and manufacturing costs are correspondingly reduced.

The modified combined orbital trimming and welding machine, generally designated 520, shown in Figures 13 to 16 inclusive is generally similar to the machine 20 of Figures 1 to 11 inclusive, with the exception of the fact that only the trimming unit is positively driven and it is connected by a roller chain to the welding unit to tow the welding unit behind it. In general, therefore, the modified machine 520 of Figures 13 to 16 inclusive for the most part has the same construction as the machine 20 of Figures 1 to 11 inclusive. Consequently similar and corresponding parts bear the same reference numerals and consequently require no further description.

The machine 520 has a platen 148 like the machine 20, also a generally similar orbital guide track 200 of L-shaped cross-section bolted thereto in a similar manner (Figure 16) and likewise a similar orbital driving rack 202 likewise bolted thereto. The inner face or edge 232 of the guide track 200 remains unchanged, but the outer face 228 (Figure 16) is provided with an orbital rib or ledge 522 which slidably supports the rollers 524 of an orbital roller chain, generally designated 526, the rollers 524 also engaging the guide track edge surface 228 while rotatably mounted upon the pivot pins 528 which are interconnected by pairs of outer and inner links 530 and 532 respectively of the roller chain 526.

The roller chain 526 is almost but not quite endless, in that it has a gap 534 (Figure 13) located between a pair of yoked end links 536 and 538, one of which is connected to the vertical shaft 214 and the other to the vertical shaft 258. The shafts 214 and 258 of Figure 14 are similarly mounted and carry the same driving pinion 208 and outer roller 260 which, as before, mesh with the driving rack 202 and engage the front surface 228 of the orbital guide track 200 respectively. Figure 15, corresponding to the mechanism in the upper left-hand corner of Figure 6, shows the inner roller 280 mounted on the vertical shaft or axle 276 as before and similarly engaging the inner edge surface 282 of the orbital guide track 200. The yoked end links 536 and 538, however, are approximately Y-shaped in side elevation (Figure 14) in that they have single links 540 and 542 respectively bored to receive the shafts 214 and 258. The single links 540 and 542 respectively branch into double-armed yokes 544 and 546 respectively bored to receive and pivotally engage the nearest pivot pins 528 of the roller chain 526.

The remainder of the trimmer carriage 104 in Figures 13 to 16 inclusive is substantially the same as the corresponding trimmer carriage 204 of Figures 1 to 11 inclusive, except that the front feet 221 which are of H- or L-shaped cross-section in Figures 1 to 11 inclusive are of U-shaped cross-section in Figures 13 to 16 inclusive in order to provide running space for the roller chain 526 (Figure 13).

The roller chain 526 at about 90 degrees angular distance from the gap 534 is provided with a second gap 550 formed between yoke-shaped or Y-shaped links 552 and 554 respectively (Figure 13) of the same construction as the Y-shaped links 536 and 538 and similarly drilled to engage the vertical shafts 392 and 404 respectively, their yokes being also drilled to engage the nearest pivot pin 528 of the roller chain 526. The shafts 404 and 392, as before, are mounted in the welder carriage housing 380 of the welder carriage 206 and this carriage housing is of similar construction to the welder carriage housing 380 of Figures 1 to 11 inclusive. The welder carriage 206, however, of Figures 13 to 16 inclusive, while having the outer and inner rollers 402 and 446 mounted on the vertical shafts 404 and 442 respectively, differs from the construction of Figures 1 to 11 inclusive in having only the roller 400 (Figure 13) loosely and rotatably mounted on the shaft 392 and omits the pinion 390 of Figure 5. Since the welder carriage 206 in Figures 13 to 16 inclusive is towed by the trimmer carriage 204, by means of the roller chain 526, there is no need for the driving motor 432, coupling 428, shaft 418 (Figure 7), worm 416, worm wheel 414, vertical shaft 412, pinion 410 and gear 396. The vertical shaft 392 of Figure 13 thus is merely required to rotatably support the roller 400 and nothing else, since it now has no driving function in the modified machine 520.

The operation of the modified trimming and welding machine 520 of Figures 13 to 16 inclusive is generally similar to that of the machine 20 of Figures 1 to 11 inclusive, especially as regards loading the workpiece carrier 62, clamping it in position under the platen 148 by means of the hydraulic plunger 154, and starting the self-propulsion of the trimmer carriage 204 clockwise (Figure 13) around the periphery of the orbital-shaped platen 148, the motor 248 driving the pinion 208 to propel the trimmer carriage 204 while the motor 374 drives the trimming wheel 360 (Figure 6) to trim the edges of the workpiece flanges 124 and 126. As the trimmer carriage 204 moves in this manner, its motion is conveyed to the welder carriage 206 through the portion of the roller chain 526 lying between the Y-shaped or yoke-shaped links 538 and 552 respectively. As a consequence, the welder carriage 206 is towed by the trimmer carriage 204 and also traverses the orbital path clockwise around the platen 148, guided by the guide track 200. At the same time, the welding appliance 492 welds the rims or flanges 124 and 126 together in an air-tight joint as the welder carriage 206 moves around its orbital circuit in response to the travel of the self-propelled trimmer carriage 204. When the circuit has been completed, and the rims 124 and 126 have been fully welded throughout their entire circumference, the operator actuates the hydraulic circuit controls to lift the hydraulic plunger 154 with its platen 148 and its connected trimmer and welder carriages 204 and 206, together with the upper clamping members 144 and 138 (Figure 6). This enables the work carrier 62 to be released from its locked position (Figure 1), by the unlocking of the lever 76 by the handle 78, whereupon the work carrier 62 is again rolled to the right onto the rails 98 of the brackets 88. The welded workpiece 102 is then lifted out of the cavity within the lower clamping members 100 and 132, and a new assembly of workpieces 104 and 106 lowered into position for another welding operation. The cycle of operation described above is then repeated in the foregoing manner.

What I claim is:

1. A machine for welding workpiece parts together in an orbital path, comprising a frame structure, a welding carriage support-moving member movably mounted on said frame structure for vertical reciprocation relatively thereto, a welding carriage support connected to said support-moving member for vertical reciprocation therewith, rails mounted on said frame structure and directed transversely thereto, said rails extending between loading and welding positions respectively, a workpiece carrier mounted for travel along said rails between said positions, opposed relatively movable clamping members mounted on said welding carriage support and workpiece carrier respectively and adapted to hold together the parts to be welded, motor reciprocatingly connected to said support-moving member for vertically reciprocating said support and clamping member mounted thereon as a unit into and out of engagement with the work piece parts resting against the other clamping member, a guide member on said support having an orbital guide surface configured to the outline of said orbital path, a welding carriage movably mounted on said support for travel in said orbital path, means on said carriage engageable with said guide member surface for confining travel of said carriage within said orbital path, means for propelling said carriage around said orbital path, and a welding implement mounted on said carriage with its weld-producing portion disposed in close proximity to the portion of said parts to be welded.

2. A machine for welding workpiece parts together in an orbital path, comprising a frame structure, a welding carriage support-moving member movably mounted on said frame structure for vertical reciprocation relatively thereto, a welding carriage support connected to said support-moving member for vertical reciprocation therewith, main rails mounted on said frame structure and directed transversely thereto, an auxiliary support disposed adjacent said frame structure, extension rails mounted on said auxiliary support and alignable with said main rails, a workpiece carrier mounted for travel along said main and extension rails between welding and loading positions, opposed relatively movable clamping members mounted on said welding carriage support and workpiece carrier respectively and adapted to hold together the parts to be welded, motor reciprocatingly connected to said support-moving member for vertically reciprocating said support and clamping member mounted thereon as a unit into and out of engagement with the workpiece parts resting against the other clamping member, a guide member on said support having an oribtal guide surface configured to the outline of said orbital path, a welding carriage movably mounted on said support for travel in said orbital path, means on said carriage engageable with said guide member surface for confining travel of said carriage within said orbital path, means for propelling said carriage around said orbital path, and a welding implement mounted on said carriage with its weld-producing portion disposed in close proximity to the portion of said parts to be welded.

3. A machine for welding workpiece parts together in an orbital path, comprising a frame structure, a welding carriage support-moving member movably mounted on said frame structure for vertical reciprocation relatively thereto, a welding carriage support connected to said support-moving member for vertical reciprocation therewith, main rails yieldingly and resiliently mounted on said frame structure and directed transversely thereto, an auxiliary support disposed adjacent said frame structure, extension rails mounted on said auxiliary support and alignable with said main rails, said main rails moving into said alignment with said extension rails in response to the separation of said clamping members from one another, a workpiece carrier mounted for travel along said main and extension rails between welding and loading positions, opposed relatively movable clamping members mounted on said welding carriage support and workpiece carrier respectively and adapted to hold together the parts to be welded, motor reciprocatingly connected to said support-moving member for vertically reciprocating said support and clamping member mounted thereon as a unit into and out of engagement with the workpiece parts resting against the other clamping member, a guide member on said support having an orbital guide surface configured to the outline of said orbital path, a welding carriage movably mounted on said support for travel in said orbital path, means on said carriage engageable with said guide member surface for confining travel of said carriage within said orbital path, means for propelling said carriage around said orbital path, and a welding implement mounted on said carriage with its weld-producing portion disposed in close proximity to the portion of said parts to be welded.

4. A machine for welding workpiece parts together in an orbital path, comprising a frame structure, a welding carriage support-moving member movably mounted on said frame structure for vertical reciprocation relatively thereto, a welding carriage support connected to said support-moving member for vertical reciprocation therewith, a workpiece carrier movably mounted for travel transversely to said frame structure between loading and welding positions, opposed relatively movable clamping members mounted on said welding carriage support and workpiece carrier respectively and adapted to hold together the parts to be welded, motor reciprocatingly connected to said support-moving member for vertically reciprocating said support and clamping member mounted thereon as a unit into and out of engagement with the workpiece parts resting against the other clamping member, means for releasably locking said workpiece carrier in the aligned positions of said clamping members, a guide member on said support having an orbital guide surface configured to the outline of said orbital path, a welding carriage movably mounted on said support for travel in said orbital path, means on said carriage engageable with said guide member surface for confining travel of said carriage within said orbital path, means for propelling said carriage around said orbital path, and a welding implement mounted on said carriage with its weld-producing portion disposed in close proximity to the portion of said parts to be welded.

References Cited in the file of this patent

UNITED STATES PATENTS

| | | |
|---|---|---|
| 1,809,653 | Wagner et al. | June 9, 1931 |
| 1,983,321 | Stephens et al. | Dec. 4, 1934 |
| 1,983,343 | Chapman | Dec. 4, 1934 |
| 2,061,287 | Muehl | Nov. 17, 1936 |
| 2,313,393 | Mitchell | Mar. 9, 1943 |
| 2,392,824 | Lytle et al. | Jan. 15, 1946 |
| 2,469,815 | Cutright | May 10, 1949 |
| 2,479,197 | Anderson | Aug. 16, 1949 |
| 2,620,420 | Abbott | Dec. 6, 1952 |
| 2,678,620 | Cote | May 18, 1954 |